United States Patent
Kawahara et al.

(10) Patent No.: US 8,974,991 B2
(45) Date of Patent: Mar. 10, 2015

(54) ELECTROPHOTOGRAPHIC PHOTOSENSITIVE MEMBER, METHOD OF PRODUCING PHTHALOCYANINE CRYSTAL, METHOD OF PRODUCING ELECTROPHOTOGRAPHIC PHOTOSENSITIVE MEMBER, PROCESS CARTRIDGE, ELECTROPHOTOGRAPHIC APPARATUS, AND PHTHALOCYANINE CRYSTAL

(71) Applicant: Canon Kabushiki Kaisha, Tokyo (JP)

(72) Inventors: Masataka Kawahara, Mishima (JP);
Masato Tanaka, Tagata-gun (JP);
Kaname Watariguchi, Mishima (JP);
Takeshi Murakami, Numazu (JP);
Akira Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/688,846

(22) Filed: Nov. 29, 2012

(65) Prior Publication Data

US 2013/0137025 A1     May 30, 2013

(30) Foreign Application Priority Data

Nov. 30, 2011 (JP) ................................ 2011-262020
Nov. 6, 2012 (JP) ................................ 2012-244475

(51) Int. Cl.
*G03G 5/00* (2006.01)
*C09B 47/04* (2006.01)
(Continued)

(52) U.S. Cl.
CPC .......... *C09B 47/045* (2013.01); *G03G 15/751* (2013.01); *G03G 21/18* (2013.01);
(Continued)

(58) Field of Classification Search
CPC .................................................. G03G 5/0696
USPC ........................................ 430/59.4; 399/159
See application file for complete search history.

(56) References Cited

U.S. PATENT DOCUMENTS 4,908,329 A    3/1990   Kanai et al.
4,908,330 A    3/1990   Arai et al.
(Continued)

FOREIGN PATENT DOCUMENTS

CN    1702564 A    11/2005
CN    1722007 A    1/2006
(Continued)

OTHER PUBLICATIONS

European Search Report dated Mar. 22, 2013 in European Application No. 12194742.8.
(Continued)

*Primary Examiner* — Mark A Chapman
(74) *Attorney, Agent, or Firm* — Fitzpatrick, Cella, Harper and Scinto

(57) ABSTRACT

Provided is an electrophotographic photosensitive member including a support and a photosensitive layer formed on the support, in which the photosensitive layer includes a phthalocyanine crystal containing a compound satisfying the following formulae (A) and (B) in itself: $8.9 \leq \delta P \leq 10.7$ (A) and $-3.2 \leq L \leq -1.5$ (B) (in the formula (A), $\delta P$ represents a polar term of Hansen Solubility Parameters, and in the formula (B), L represents an energy level (eV) of an LUMO (lowest unoccupied molecular orbital) obtained as a result of structural optimization calculation based on density functional calculation B3LYP/6-31G).

5 Claims, 4 Drawing Sheets

(51) Int. Cl.

| | | |
|---|---|---|
| G03G 15/00 | (2006.01) | |
| G03G 21/18 | (2006.01) | |
| C09B 67/50 | (2006.01) | |
| G03G 5/05 | (2006.01) | |
| G03G 5/06 | (2006.01) | |
| G03G 5/147 | (2006.01) | |
| C09B 57/00 | (2006.01) | |
| C09B 67/12 | (2006.01) | |
| C09B 67/00 | (2006.01) | |

(52) U.S. Cl.
CPC .......... *C09B67/0026* (2013.01); *G03G 5/0542* (2013.01); *G03G 5/0564* (2013.01); *G03G 5/0614* (2013.01); *G03G 5/0696* (2013.01); *G03G 5/14756* (2013.01); *C09B 57/008* (2013.01); *C09B 67/0016* (2013.01); *C09B 67/0023* (2013.01)
USPC .......................................... 430/59.4; 399/159

(56) References Cited

U.S. PATENT DOCUMENTS

| | | | |
|---|---|---|---|
| 5,194,353 | A | 3/1993 | Tanaka et al. |
| 5,246,807 | A | 9/1993 | Kanemaru et al. |
| 5,389,478 | A | 2/1995 | Yoshida et al. |
| 5,453,342 | A | 9/1995 | Go et al. |
| 5,464,718 | A | 11/1995 | Kashizaki et al. |
| 5,527,653 | A | 6/1996 | Tanaka |
| 5,561,015 | A | 10/1996 | Yoshida et al. |
| 5,629,116 | A | 5/1997 | Kashizaki et al. |
| 5,666,589 | A | 9/1997 | Yoshinaga et al. |
| 5,759,291 | A | 6/1998 | Ichinose et al. |
| 5,811,212 | A | 9/1998 | Tanaka |
| 5,818,489 | A | 10/1998 | Yoshinaga et al. |
| 5,876,888 | A | 3/1999 | Anayama et al. |
| 5,910,386 | A | 6/1999 | Yoshinaga et al. |
| 5,912,098 | A | 6/1999 | Tanaka et al. |
| 6,040,100 | A | 3/2000 | Tanaka et al. |
| 6,093,515 | A | 7/2000 | Yoshida et al. |
| 6,139,997 | A | 10/2000 | Tanaka et al. |
| 6,146,800 | A | 11/2000 | Yoshida et al. |
| 6,183,922 | B1 | 2/2001 | Takai et al. |
| 6,190,811 | B1 | 2/2001 | Tanaka et al. |
| 6,218,063 | B1 | 4/2001 | Tanaka et al. |
| 6,245,472 | B1 | 6/2001 | Tanaka |
| 6,248,490 | B1 | 6/2001 | Suzuki et al. |
| 6,258,498 | B1 | 7/2001 | Kawahara et al. |
| 6,270,936 | B1 | 8/2001 | Tanaka et al. |
| 6,296,978 | B1 | 10/2001 | Takaya et al. |
| 6,335,132 | B1 | 1/2002 | Tanaka et al. |
| 6,391,505 | B1 | 5/2002 | Hamasaki et al. |
| 6,472,524 | B2 | 10/2002 | Tanaka |
| 6,551,752 | B2 | 4/2003 | Takaya et al. |
| 6,623,899 | B2 | 9/2003 | Takaya et al. |
| 6,683,175 | B2 | 1/2004 | Tanaka |
| 6,773,856 | B2 | 8/2004 | Tanaka et al. |
| 6,833,227 | B2 | 12/2004 | Tanaka |
| 6,942,952 | B2 | 9/2005 | Uesugi et al. |
| 6,991,881 | B2 | 1/2006 | Ogaki et al. |
| 7,001,699 | B2 | 2/2006 | Tanaka et al. |
| 7,245,851 | B2 | 7/2007 | Fujii et al. |
| 7,276,318 | B2 | 10/2007 | Fujii et al. |
| 7,333,752 | B2 | 2/2008 | Kawahara et al. |
| 7,387,862 | B2 | 6/2008 | Toriyama et al. |
| 7,517,626 | B2 | 4/2009 | Fujii et al. |
| 7,551,878 | B2 | 6/2009 | Ogaki et al. |
| 7,585,604 | B2 | 9/2009 | Ogaki et al. |
| 7,622,238 | B2 | 11/2009 | Uematsu et al. |
| 7,629,102 | B2 | 12/2009 | Ochi et al. |
| 7,702,256 | B2 | 4/2010 | Nukada et al. |
| 7,718,331 | B2 | 5/2010 | Uematsu et al. |
| 7,749,667 | B2 | 7/2010 | Kawahara et al. |
| 7,910,274 | B2 | 3/2011 | Tanaka et al. |
| 7,927,774 | B2 | 4/2011 | Ogaki et al. |
| 8,088,541 | B2 | 1/2012 | Tanaka et al. |
| 8,340,551 | B2 | 12/2012 | Yamanaka et al. |
| 2007/0148570 | A1 | 6/2007 | Iwasaki et al. |
| 2009/0061340 | A1 | 3/2009 | Lin et al. |
| 2011/0045390 | A1 | 2/2011 | Tanaka |
| 2011/0293323 | A1 | 12/2011 | Tanaka et al. |
| 2012/0003576 | A1 | 1/2012 | Tanaka et al. |
| 2012/0033994 | A1 | 2/2012 | Tanaka et al. |
| 2012/0115076 | A1 | 5/2012 | Kitamura et al. |
| 2013/0137023 | A1 | 5/2013 | Watariguchi et al. |
| 2013/0137032 | A1 | 5/2013 | Tanaka et al. |

FOREIGN PATENT DOCUMENTS

| | | |
|---|---|---|
| CN | 101167022 A | 4/2008 |
| CN | 101900957 A | 12/2010 |
| EP | 2 402 819 A1 | 1/2012 |
| JP | 6-273953 A | 9/1994 |
| JP | 2001-40237 A | 2/2001 |
| JP | 2006-72304 A | 3/2006 |
| JP | 2007-138153 A | 6/2007 |
| JP | 2007-332052 A | 12/2007 |
| KR | 10-2007-0068249 A | 6/2007 |

OTHER PUBLICATIONS

Becke, et al., "Density-functional thermochemistry. III. The role of exact exchange", J. Chem. Phys., vol. 98, No. 7, 1993, pp. 5648-5652.
Lee, et al., "Development of the Colle-Salvetti correlation-energy formula into a functional of the electron density", Physical Review B, vol. 37, No. 2, 1988, pp. 785-789.
Miehlich, et al., "Results Obtained With the Correlation Energy Density Functionals of Becke and Lee, Yang and Parr", Chemical Physics Letters, vol. 157, No. 3, 1989, pp. 200-206.
Hansen, C.M., "Hansen Solubility Parameters: A User's Handbook", 2nd ed., 2007, pp. 1-25.
Tanaka, et al., U.S. Appl. No. 13/688,880, filed Nov. 29, 2012.
Chinese Office Action dated May 30, 2014 in Chinese Application No. 201210501758.4.

ELECTROPHOTOGRAPHIC PHOTOSENSITIVE MEMBER, METHOD OF PRODUCING PHTHALOCYANINE CRYSTAL, METHOD OF PRODUCING ELECTROPHOTOGRAPHIC PHOTOSENSITIVE MEMBER, PROCESS CARTRIDGE, ELECTROPHOTOGRAPHIC APPARATUS, AND PHTHALOCYANINE CRYSTAL

BACKGROUND OF THE INVENTION

1. Field of the Invention

The present invention relates to an electrophotographic photosensitive member, a method of producing a phthalocyanine crystal, a method of producing an electrophotographic photosensitive member, a process cartridge, an electrophotographic apparatus, and a phthalocyanine crystal.

2. Description of the Related Art

An oscillation wavelength of semiconductor laser, which has been frequently used as an image exposing unit for an electrophotographic apparatus is, at present, a long wavelength such as 650 to 820 nm. Accordingly, development of an electrophotographic photosensitive member having high sensitivity to light having such a long wavelength has been advanced.

A phthalocyanine pigment is effective as a charge-generating substance having high sensitivity to light having a wavelength in such a long-wavelength region. In particular, oxytitanium phthalocyanine and gallium phthalocyanine have excellent sensitivity characteristics, and various crystal forms thereof have been reported heretofore.

An electrophotographic photosensitive member using the phthalocyanine pigment has an excellent sensitivity characteristic. However, a produced photocarrier is liable to remain on the photosensitive layer of the electrophotographic photosensitive member. Accordingly, the electrophotographic photosensitive member involves the following problem. That is, a short-term electric potential variation as a kind of memory occurs, which is liable to cause an image defect such as a ghost image, and to cause a long-term electric potential variation in association with repeated use.

Japanese Patent Application Laid-Open No. 2001-40237 reports that addition of a specific organic electron acceptor at the time of an acid pasting process for the phthalocyanine pigment exerts a sensitizing effect. However, the approach involves the following concern and problem. The additive may chemically change, thereby being difficult to transform the additive into a desired crystal form.

In addition, Japanese Patent Application Laid-Open No. 2006-72304 reports the following. When the pigment and a specific organic electron acceptor are subjected to a wet pulverization treatment, the organic electron acceptor is incorporated in a surface of the crystal simultaneously with crystal transformation, and hence the electrophotographic characteristics are improved.

However, a phthalocyanine crystal obtained by the approach does not contain the organic electron acceptor in itself, and the acceptor is merely in a state of being mixed with the crystal or merely adheres to its surface. Accordingly, the approach is identical in constitution and effect to the so-called addition at the time of dispersion in which a specific organic electron acceptor is added at the time of production of a coating liquid for a charge-generating layer.

In addition, Japanese Patent Application Laid-Open No. 2007-138153 discloses that a fluorinated aromatic compound is incorporated in a phthalocyanine crystal and Japanese Patent Application Laid-Open No. 2007-332052 discloses that an amino compound is incorporated in a phthalocyanine crystal.

As described above, various improvements have been attempted for an electrophotographic photosensitive member.

However, the alleviation of an image density variation due to an electric potential variation in the photosensitive member under various environments has been desired in association with an additional improvement in image quality in recent years. Investigations conducted by the inventors of the present invention have shown that the technology described in each of Japanese Patent Application Laid-Open Nos. 2001-40237, 2006-72304, 2007-138153, and 2007-332052 has been susceptible to improvement in terms of the suppression of an electric potential variation at the time of repeated use of an electrophotographic photosensitive member under a low-temperature, low-humidity environment.

SUMMARY OF THE INVENTION

In view of the foregoing, the present invention is directed to providing an electrophotographic photosensitive member, a method of producing the electrophotographic photosensitive member, and a process cartridge and an electrophotographic apparatus each having the electrophotographic photosensitive member that have solved the problems and can output images whose image densities vary to a reduced extent from the beginning of continuous printing to the ending thereof not only under a normal-temperature, normal-humidity environment but also under a low-temperature, low-humidity environment as a particularly severe condition.

Further, the present invention is directed to providing a phthalocyanine crystal containing a compound satisfying specific physical property in itself and a method of producing the crystal.

Investigations conducted by the inventors of the present invention have found that the use of a phthalocyanine crystal containing in itself such a compound that the polar term of Hansen Solubility Parameters and the energy level of an LUMO are controlled to fall within specific ranges shows an excellent effect on the suppression of an electric potential variation at the time of repeated use of an electrophotographic photosensitive member under a low-temperature, low-humidity environment.

The present invention provides an electrophotographic photosensitive member, including: a support; and a photosensitive layer formed on the support, in which the photosensitive layer includes a phthalocyanine crystal containing a compound satisfying the following formulae (A) and (B) in itself:

$$8.9 \leq \delta P \leq 10.7 \quad (A)$$

$$-3.2 \leq L \leq -1.5 \quad (B)$$

in the formula (A), $\delta P$ represents a polar term of Hansen Solubility Parameters, and in the formula (B), L represents an energy level (eV) of an LUMO (lowest unoccupied molecular orbital) obtained as a result of structural optimization calculation based on density functional calculation B3LYP/6-31G.

The present invention also provides an electrophotographic photosensitive member, including: a support; and a photosensitive layer formed on the support, in which the photosensitive layer includes a phthalocyanine crystal containing a compound represented by the following formula (1) in itself:

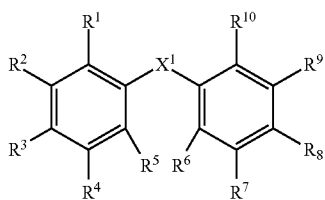

(1)

in the formula (1): $R^1$ to $R^{10}$ each independently represent a hydrogen atom, a hydroxy group, a halogen atom, an aryloxycarbonyl group, an acyl group, a substituted or unsubstituted alkyl group, a substituted or unsubstituted alkoxy group, or a substituted or unsubstituted aryloxy group;

a substituent of the substituted alkyl group, a substituent of the substituted alkoxy group, and a substituent of the substituted aryloxy group is each a halogen atom, a hydroxy group, or an alkoxy group;

at least one of $R^1$ to $R^{10}$ is a hydroxy group or an alkoxy group; and $X^1$ represents one of a carbonyl group and a dicarbonyl group.

The present invention also provides a method of producing a phthalocyanine crystal, which includes the step of: subjecting a phthalocyanine crystal, and a compound satisfying the following formulae (A) and (B), which are added to a solvent, to a milling treatment:

$$8.95 \leq \delta P \leq 10.7 \quad \text{(A)}$$

$$-3.2 \leq L \leq -1.5 \quad \text{(B)}$$

in the formula (A), δP represents a polar term of Hansen Solubility Parameters, and in the formula (B), L represents an energy level (eV) of an LUMO obtained as a result of structural optimization calculation based on density functional calculation B3LYP/6-31G.

The present invention also provides a method of producing an electrophotographic photosensitive member which includes a support and a photosensitive layer formed on the support, including the step of: producing a phthalocyanine crystal by the above-described production method; and forming the photosensitive layer with the produced phthalocyanine crystal.

The present invention also provides a process cartridge, including: the above-described electrophotographic photosensitive member; and at least one unit selected from the group consisting of a charging unit for charging a surface of the electrophotographic photosensitive member, a developing unit for developing an electrostatic latent image formed on the surface of the electrophotographic photosensitive member with toner to form a toner image, and a cleaning unit for removing the toner on the surface of the electrophotographic photosensitive member after transfer of the toner image onto a transfer material, the electrophotographic photosensitive member and the at least one unit being integrally supported, in which the process cartridge is detachably mountable to a main body of an electrophotographic apparatus.

The present invention also provides an electrophotographic apparatus, including: the above-described electrophotographic photosensitive member; a charging unit for charging a surface of the electrophotographic photosensitive member; an image exposing unit for irradiating the charged surface of the electrophotographic photosensitive member with image exposure light to form an electrostatic latent image; a developing unit for developing the electrostatic latent image formed on the surface of the electrophotographic photosensitive member with toner to form a toner image; and a transferring unit for transferring the toner image formed on the surface of the electrophotographic photosensitive member onto a transfer material.

The present invention also provides a phthalocyanine crystal, including a compound satisfying the following formulae (A) and (B) in itself:

$$8.95 \leq \delta P \leq 10.7 \quad \text{(A)}$$

$$-3.2 \leq L \leq -1.5 \quad \text{(B)}$$

in the formula (A), δP represents a polar term of Hansen Solubility Parameters, and in the formula (B), L represents an energy level (eV) of an LUMO obtained as a result of structural optimization calculation based on density functional calculation B3LYP/6-31G.

According to the present invention, there is provided the electrophotographic photosensitive member, the method of producing the electrophotographic photosensitive member, and the process cartridge and the electrophotographic apparatus each having the electrophotographic photosensitive member that can output images whose image densities vary to a reduced extent from the beginning of continuous printing to the ending thereof not only under a normal-temperature, normal-humidity environment but also under a low-temperature, low-humidity environment as a particularly severe condition.

Further, according to the present invention, provided is the phthalocyanine crystal having excellent characteristics as a charge-generating substance.

Further features of the present invention will become apparent from the following description of exemplary embodiments with reference to the attached drawings.

DESCRIPTION OF THE EMBODIMENTS

Figure 1:
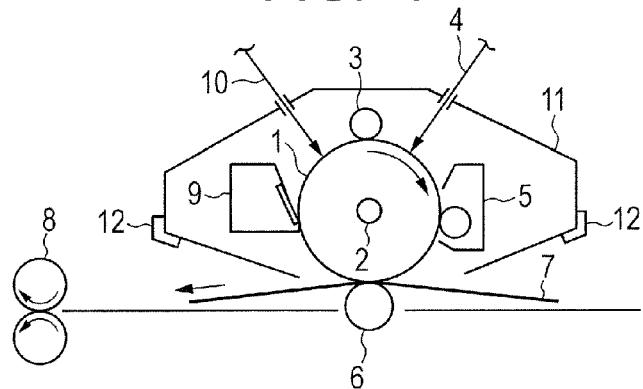
FIG. 1 is a view illustrating an example of the schematic configuration of an electrophotographic apparatus provided with a process cartridge having an electrophotographic photosensitive member of the present invention.

As described above, an electrophotographic photosensitive member of present invention is an electrophotographic photosensitive member, including: a support; and a photosensitive layer formed on the support, in which the photosensitive layer includes a phthalocyanine crystal containing a compound satisfying the following formulae (A) and (B) in itself:

$$8.9 \leq \delta P \leq 10.7 \quad (A)$$

$$-3.2 \leq L \leq -1.5 \quad (B)$$

(in the formula (A), δP represents a calculated value for the polar term of Hansen Solubility Parameters, and in the formula (B), L represents the energy level (eV) of an LUMO (lowest unoccupied molecular orbital) obtained as a result of structural optimization calculation based on density functional calculation B3LYP/6-31G).

The inventors of the present invention consider the reason why the electrophotographic photosensitive member including the phthalocyanine crystal containing the compound satisfying the formulae (A) and (B) in itself shows an excellent characteristic for a long-term electric potential variation in association with its repeated use to be as described below. The polar term δP of the Hansen Solubility Parameters represents an effect of the dipole force of molecules on the molecules and the energy level of the LUMO represents an indicator of the ease with which an electron is accepted. It is assumed from the foregoing that when the compound incorporated in a state of satisfying the formula (A) into the crystal satisfies the physical property represented by the formula (B), the flow of an electron improves, thereby preventing an increase in residual charge present around the phthalocyanine crystal.

The Hansen Solubility Parameters are described in detail in Hansen, Charles (2007). Hansen Solubility Parameters: A user's handbook, Second Edition. Boca Raton, Fla.: CRC Press. ISBN 9780849372483.

In the present application, Hansen Solubility Parameters in Practice (HSPiP) software was used to determine the Hansen Solubility Parameters.

In addition, B3LYP as a kind of density functional theory was employed for the energy calculation of the LUMO, and the energy was obtained by determining a stable structure through structural optimization calculation at a 6-31G level.

B3LYP is described in detail in A. D. Becke, J. Chem. Phys. 98, 5648 (1993), C. Lee, W. Yang, and R. G. Parr, Phys. Rev. B37, 785 (1988), and B. Miehlich, A. Savin, H. Stoll, and H. Preuss, Chem. Phys. Lett. 157, 200 (1989).

At least one kind selected from the group consisting of a condensation polycyclic compound having a hydroxy group or an alkoxy group, a polyphenyl compound having a hydroxy group or an alkoxy group, and an aromatic ketone compound having a hydroxy group or an alkoxy group can be suitably utilized as the compound satisfying the formulae (A) and (B).

In addition, a compound represented by the following formula (1) can be suitably utilized in the present application.

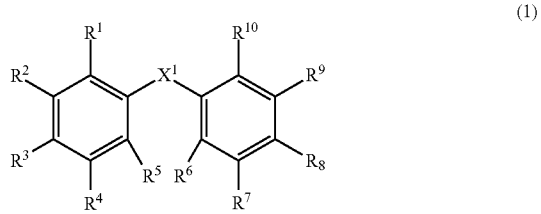

(1)

(In the formula (1), $R^1$ to $R^{10}$ each independently represent a hydrogen atom, a hydroxy group, a halogen atom, an aryloxy- carbonyl group, an acyl group, a substituted or unsubstituted alkyl group, a substituted or unsubstituted alkoxy group, or a substituted or unsubstituted aryloxy group; a substituent of the substituted alkyl group, a substituent of the substituted alkoxy group, and a substituent of the substituted aryloxy group is each a halogen atom, a hydroxy group, or an alkoxy group; at least one of $R^1$ to $R^{10}$ is a hydroxy group or an alkoxy group, and $X^1$ represents one of a carbonyl group and a dicarbonyl group.)

Specific examples of the compound satisfying the formulae (A) and (B) (Exemplified Compounds) are shown below, and the results of the calculation of their physical property values are shown in Table 1. However, the present invention is not limited thereto.

Exemplified Compound (A-1)

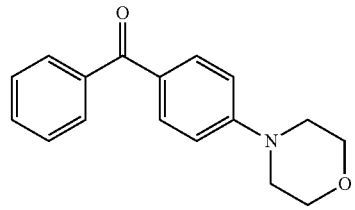

Exemplified Compound (A-2)

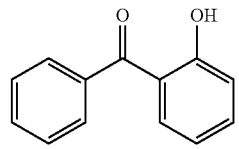

Exemplified Compound (A-3)

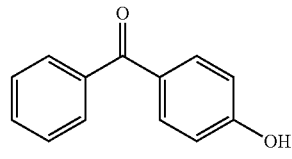

Exemplified Compound (A-4)

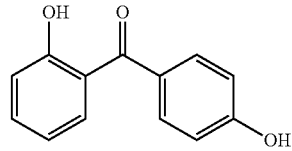

Exemplified Compound (A-5)

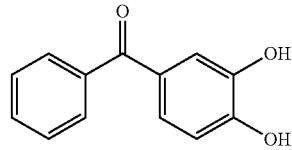

Exemplified Compound (A-6)

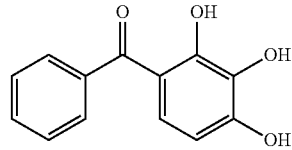

Exemplified Compound (A-7)

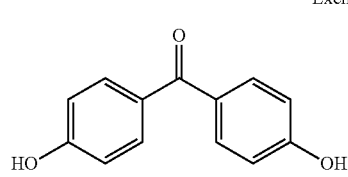

-continued

Exemplified Compound (A-8)
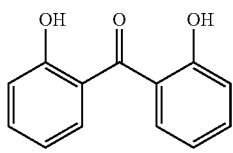

Exemplified Compound (A-9)
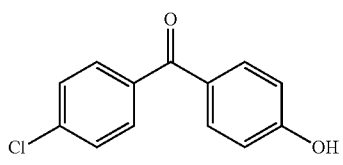

Exemplified Compound (A-10)
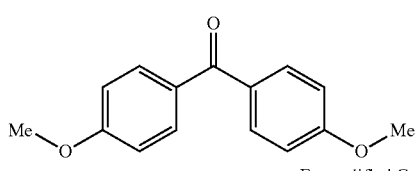

Exemplified Compound (A-11)
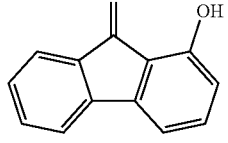

Exemplified Compound (A-12)
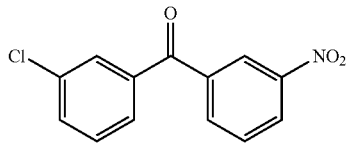

Exemplified Compound (A-13)
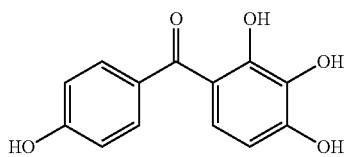

Exemplified Compound (A-14)
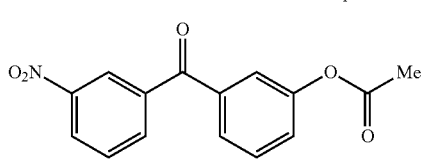

In the Exemplified Compounds, Me represents a methyl group.

TABLE 1

|  | Calculated value for δP | Calculated value for LUMO |
| --- | --- | --- |
| Exemplified Compound (A-1) | 9.4 | −1.6 |
| Exemplified Compound (A-2) | 9.1 | −1.6 |
| Exemplified Compound (A-3) | 8.9 | −1.8 |
| Exemplified Compound (A-4) | 10.5 | −1.5 |
| Exemplified Compound (A-5) | 10.6 | −1.8 |
| Exemplified Compound (A-6) | 10.0 | −1.6 |
| Exemplified Compound (A-7) | 10.2 | −1.7 |
| Exemplified Compound (A-8) | 10.7 | −2.0 |
| Exemplified Compound (A-9) | 9.1 | −2.0 |
| Exemplified Compound (A-10) | 9.5 | −1.5 |

TABLE 1-continued

|  | Calculated value for δP | Calculated value for LUMO |
| --- | --- | --- |
| Exemplified Compound (A-11) | 10.3 | −2.3 |
| Exemplified Compound (A-12) | 10.7 | −3.2 |
| Exemplified Compound (A-13) | 10.7 | −2.1 |
| Exemplified Compound (A-14) | 9.3 | −3.0 |

In addition, specific examples of a compound that does not satisfy the expression (A) or (B) (Exemplified Compounds) are shown below, and the results of the calculation of their physical property values are shown in Table 2 and Table 3.

Exemplified Compound (B-1)
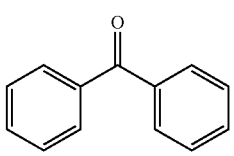

Exemplified Compound (B-2)
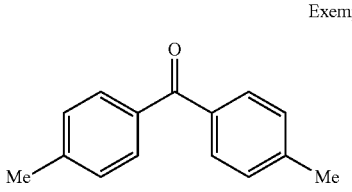

Exemplified Compound (B-3)
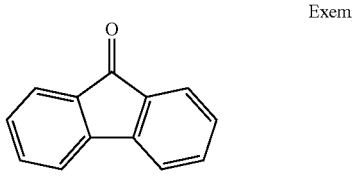

Exemplified Compound (B-4)
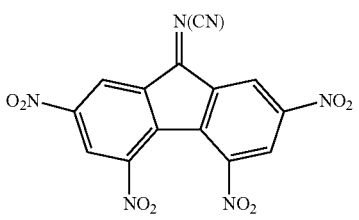

Exemplified Compound (B-5)
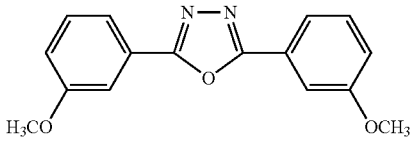

Exemplified Compound (B-6)
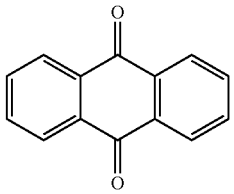

Exemplified Compound (B-7)

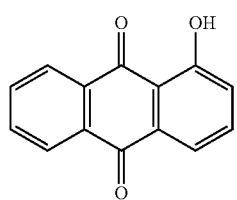

Exemplified Compound (B-8)

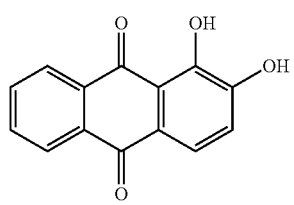

Exemplified Compound (B-9)

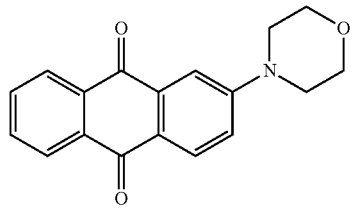

Exemplified Compound (B-10)

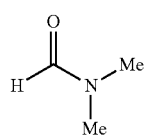

Exemplified Compound (B-11)

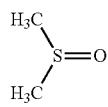

Exemplified Compound (B-12)

Exemplified Compound (B-13)

Exemplified Compound (B-14)

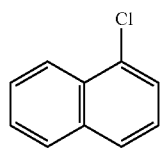

Exemplified Compound (B-15)

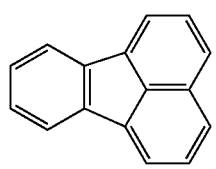

Exemplified Compound (B-16)

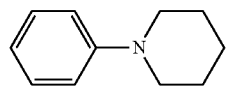

Exemplified Compound (B-17)

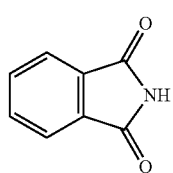

Exemplified Compound (B-18)

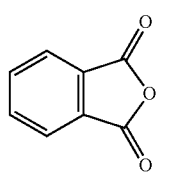

Exemplified Compound (B-19)

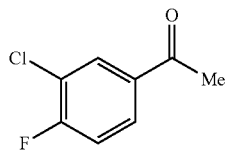

Exemplified Compound (B-20)

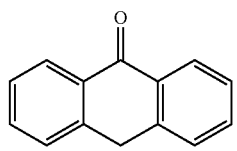

Exemplified Compound (B-21)

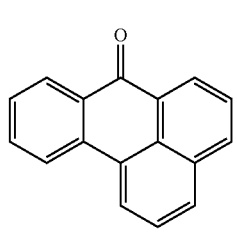

TABLE 2

| | Calculated value for δP |
|---|---|
| Exemplified Compound (B-1) | 6.7 |
| Exemplified Compound (B-2) | 8.0 |
| Exemplified Compound (B-3) | 8.2 |
| Exemplified Compound (B-4) | 2.2 |
| Exemplified Compound (B-5) | 8.5 |
| Exemplified Compound (B-6) | 12.3 |
| Exemplified Compound (B-7) | 14.3 |
| Exemplified Compound (B-8) | 13.4 |
| Exemplified Compound (B-9) | 13.2 |
| Exemplified Compound (B-10) | 14.8 |
| Exemplified Compound (B-11) | 19.7 |
| Exemplified Compound (B-12) | 6.5 |
| Exemplified Compound (B-13) | 4.2 |
| Exemplified Compound (B-14) | 3.2 |
| Exemplified Compound (B-15) | 4.4 |
| Exemplified Compound (B-16) | 3.5 |
| Exemplified Compound (B-17) | 18.4 |
| Exemplified Compound (B-18) | 14.4 |
| Exemplified Compound (B-19) | 10.9 |
| Exemplified Compound (B-20) | 7.4 |
| Exemplified Compound (B-21) | 5.6 |

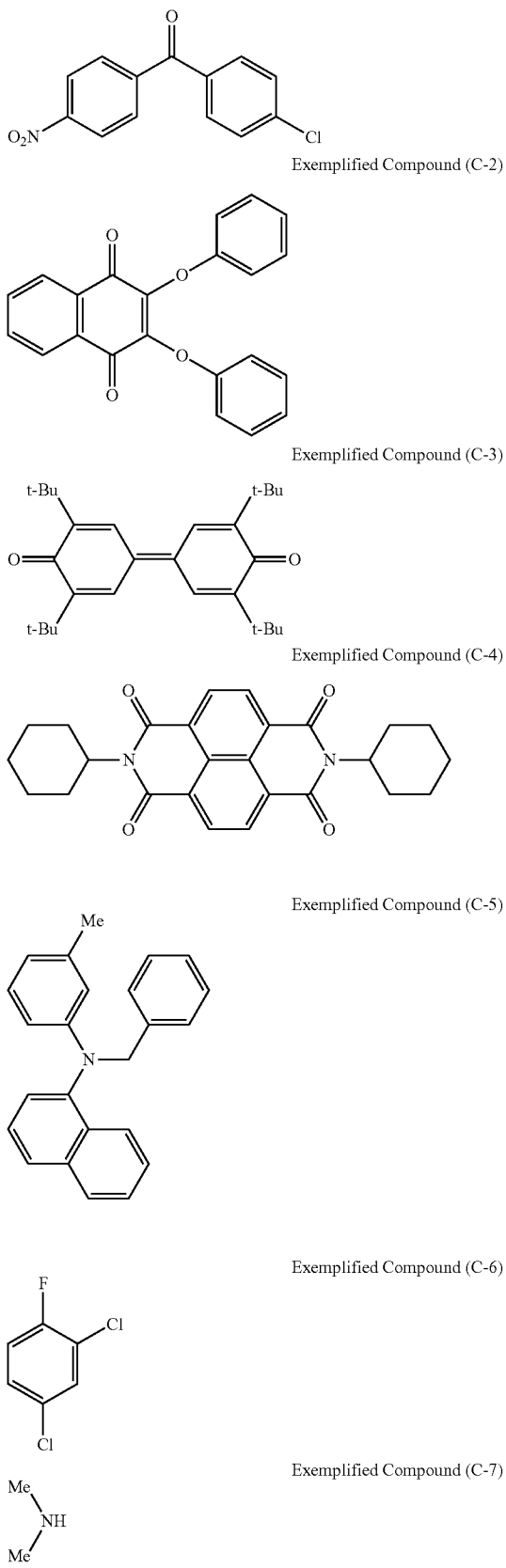

TABLE 3

| | Calculated value for LUMO |
|---|---|
| Exemplified Compound (C-1) | −3.4 |
| Exemplified Compound (C-2) | −3.4 |
| Exemplified Compound (C-3) | −3.7 |
| Exemplified Compound (C-4) | −3.6 |
| Exemplified Compound (C-5) | −1.2 |
| Exemplified Compound (C-6) | −1.2 |
| Exemplified Compound (C-7) | 2.4 |

Examples of the phthalocyanine pigment include non-metal phthalocyanine and metal phthalocyanine. Those phthalocyanine pigments may have an axial ligand or a substituent.

Of the phthalocyanine pigments, oxytitanium phthalocyanine and gallium phthalocyanine are preferred because of having high sensitivity.

Examples of the phthalocyanine constituting the phthalocyanine crystal containing the compound satisfying the formulae (A) and (B) in itself of the present invention include non-metal phthalocyanine and metal phthalocyanine. Those phthalocyanines may have an axial ligand or a substituent. Examples thereof include a phthalocyanine having a halogen atom, a hydroxy group, or an alkoxy group as an axial ligand at a gallium atom in a gallium phthalocyanine molecule. A phthalocyanine may have a substituent such as a halogen atom in its phthalocyanine ring.

Of the gallium phthalocyanine crystals, hydroxygallium phthalocyanine crystals (in which a gallium atom has a hydroxy group as an axial ligand), bromogallium phthalocyanine crystals (in which a gallium atom has a bromine atom as an axial ligand), or iodogallium phthalocyanine crystals (in which a gallium atom has an iodine atom as an axial ligand) each having excellent sensitivity are preferred because the present invention effectively acts.

Further, of the gallium phthalocyanine crystals, the following crystals are preferred:

a hydroxygallium phthalocyanine crystal having peaks at Bragg angles 2θ±0.2° of 7.4°, 27.4°, and 28.3° in CuKα X-ray diffraction;

a hydroxygallium phthalocyanine crystal having peaks at Bragg angles 2θ±0.2° of 7.4°, 16.6°, 21.8°, 25.5°, and 28.3° in CuKα X-ray diffraction;

a bromogallium phthalocyanine crystal having peaks at Bragg angles 2θ±0.2° of 7.4°, 27.1°, and 28.4° in CuKα X-ray diffraction; and an iodogallium phthalocyanine crystal having peaks at Bragg angles 2θ±0.2° of 20.4°, 27.1°, 29.0°, and 33.2° in CuKα X-ray diffraction.

The term "phthalocyanine crystal containing the compound satisfying the formulae (A) and (B) in itself" means that the crystal incorporates the compound satisfying the formulae (A) and (B) in itself. A method of producing the phthalocyanine crystal containing the compound satisfying the formulae (A) and (B) in itself is described.

The phthalocyanine crystal containing the compound satisfying the formulae (A) and (B) in itself of the present invention is preferably obtained by adding, in the process of subjecting a low-crystalline phthalocyanine treated by an acid pasting method to a wet milling treatment to perform its crystal transformation, the compound satisfying the formulae (A) and (B), followed by a milling treatment with a solvent.

The milling treatment to be performed here is, for example, a treatment to be performed with a milling apparatus such as a sand mill and a ball mill together with a dispersant such as a glass bead, a steel bead, and an alumina ball. A milling time is preferably about 4 to 48 hours. A particularly preferred method is as described below. The sample is taken every 4 to 8 hours and the Bragg angle of the crystal is identified. The amount of the dispersant to be used in the milling treatment is preferably 10 to 50 times as large as that of the phthalocyanine crystal on a mass basis. In addition, examples of the solvent to be used include: an amide-based solvent such as N,N-dimethylformamide, N,N-dimethylacetamide, N-methylformamide, N-methylacetamide, N-methylpropioamide, and N-methyl-2-pyrrolidone; a halogen-based solvent such as chloroform; an ether-based solvent such as tetrahydrofuran; and a sulfoxide-based solvent such as dimethyl sulfoxide. The usage of the solvent is preferably 5 to 30 times as large as that of the phthalocyanine crystal on a mass basis. The usage of the compound satisfying the formulae (A) and (B) is preferably 0.1 to 10 times as large as that of the phthalocyanine crystal on a mass basis.

Whether the phthalocyanine crystal of the present invention contained the compound satisfying the formulae (A) and (B) in itself was determined by analyzing data on the thermogravimetric (TG) measurement, X-ray diffraction measurement, and NMR measurement of the resultant phthalocyanine crystal.

For example, when a system to which a compound to be incorporated has been added and a phthalocyanine crystal obtained by the same preparation except that the compound is not added are individually subjected to TG measurement, and the result of the TG measurement of the phthalocyanine crystal obtained in the system to which the compound to be incorporated has been added can be interpreted as a result obtained merely by mixing individual measured results at a predetermined ratio, the system can be interpreted as a mixture of the crystal and the compound or as such a product that the compound merely adheres to the surface of the crystal.

On the other hand, when the result of the TG measurement of the phthalocyanine crystal obtained in the system to which the compound to be incorporated has been added is such that a weight reduction occurs at a higher temperature than that in the case of the result of the TG measurement of the compound to be incorporated, it can be judged that the compound to be incorporated is incorporated into the crystal.

In addition, when the result of the X-ray diffraction of the system can be interpreted as a result obtained merely by mixing individual measured results at a predetermined ratio, the system can be interpreted as a mixture of the crystal and the compound or as such a product that the compound merely adheres to the surface of the crystal.

On the other hand, when no X-ray diffraction of the compound to be incorporated exists or when the resultant crystal form is changed, it can be judged that the compound to be incorporated is incorporated into the crystal.

Further, in the case where a milling treatment with a solvent capable of dissolving the compound to be incorporated or a washing process after the milling is sufficiently performed, when the compound to be incorporated is detected in NMR measurement, it can be judged that the compound to be incorporated is incorporated into the crystal.

The TG measurement, X-ray diffraction measurement, and NMR measurement of the phthalocyanine crystal of the present invention were performed under the following conditions.

(TG Measurement)
Used measuring apparatus: TG/DTA simultaneous measurement apparatus (trade name: TG/DTA220U) manufactured by Seiko Instruments Inc.

Atmosphere: under nitrogen flow (300 m$^2$/min)
Measurement range: 35° C. to 600° C.
Temperature increasing rate: 10° C./min (Powder X-Ray Diffraction Measurement)
Used measuring apparatus: X-ray diffractometer RINT-TTRII manufactured by Rigaku Corporation
X-ray tube bulb: Cu
Tube voltage: 50 KV
Tube current: 300 mA
Scanning method: 2θ/0 scan
Scanning rate: 4.0°/min
Sampling interval: 0.02°
Start angle (2θ): 5.0°
Stop angle (2θ): 40.0°
Attachment: standard sample holder
Filter: not used
Incident monochrome: used
Counter monochromator: not used
Divergence slit: open
Divergence longitudinal restriction slit: 10.00 mm
Scattering slit: open
Light-receiving slit: open
Flat monochromator: used
Counter: scintillation counter (NMR Measurement)
Used measuring apparatus: AVANCE III 500 manufactured by BRUKER
Solvent: deuterated sulfuric acid ($D_2SO_4$)

The phthalocyanine crystal containing the compound satisfying the formulae (A) and (B) in itself of the present invention is excellent in function as a photoconductor and is hence applicable to a solar cell, a sensor, a switching element, or the like as well as to an electrophotographic photosensitive member.

Next, the case where the phthalocyanine crystal containing the compound satisfying the formulae (A) and (B) in itself of the present invention is applied as a charge-generating substance in an electrophotographic photosensitive member is described.

Photosensitive layers are classified into a photosensitive layer formed of a single layer containing both the charge-generating substance and a charge-transporting substance (single-layer photosensitive layer), and a photosensitive layer obtained by laminating a charge-generating layer containing the charge-generating substance and a charge-transporting layer containing the charge-transporting substance (laminated photosensitive layer). It should be noted that the charge-generating layer may be laminated on the charge-transporting layer and vice versa.

The support to be used in the present invention is preferably a support having electro-conductivity (electro-conductive support). As the support, there may be used, for example, aluminum, an aluminum alloy, copper, zinc, stainless, vanadium, molybdenum, chromium, titanium, nickel, indium, gold, and platinum. In addition, there may be used: a plastic (e.g., a polyethylene, a polypropylene, a polyvinyl chloride, a polyethylene terephthalate, an acrylic resin, and a polyfluoroethylene) having a layer of aluminum, an aluminum alloy, indium oxide, tin oxide, or an indium oxide-tin oxide alloy formed into a film by vacuum vapor deposition; a support obtained by coating a plastic or the above-mentioned support with electro-conductive particles (e.g., aluminum particles, titanium oxide particles, tin oxide particles, zinc oxide particles, carbon black, and silver particles) and a binder resin; a support obtained by impregnating a plastic or paper with electro-conductive particles; a plastic including an electro-conductive polymer; and the like.

In the present invention, an undercoat layer having a barrier function and an adhesion function (sometimes referred to as "barrier layer" or "intermediate layer") may be provided between the support and the photosensitive layer.

As the material for the undercoat layer, there may be used a polyvinyl alcohol, a polyethylene oxide, ethyl cellulose, methyl cellulose, casein, polyamides (e.g., nylon 6, nylon 66, nylon 610, a copolymer nylon, and an N-alkoxymethylated nylon), a polyurethane, glue, aluminum oxide, gelatin, and the like. The thickness of the undercoat layer is 0.1 to 10 µm, preferably 0.5 to 5 µm.

When the single-layer photosensitive layer is formed, the formation thereof can be performed by: mixing the charge-generating substance made of the phthalocyanine crystal according to the present invention and the charge-transporting substance into a binder resin solution; applying the mixed liquid onto the support; and drying the resultant applied film.

When the laminated photosensitive layer is formed, the charge-generating layer can be formed by: applying a coating liquid for a charge-generating layer obtained by dispersing the phthalocyanine crystal according to the present invention in a binder resin solution; and drying the resultant applied film. Alternatively, the charge-generating layer can be formed by vapor deposition.

The charge-transporting layer may be formed by: applying a coating liquid for a charge-transporting layer obtained by dissolving the charge-transporting substance and a binder resin in a solvent; and drying the resultant applied film.

Examples of the charge-transporting substance include a triarylamine-based compound, a hydrazone-based compound, a stilbene-based compound, a pyrazoline-based compound, an oxazole-based compound, a thiazole-based compound, and a triarylmethane-based compound.

Examples of the binding resin to be used for each layer include resins such as a polyester, an acrylic resin, a polyvinylcarbazole, a phenoxy resin, a polycarbonate, a polyvinyl butyral, a polystyrene, a polyvinyl acetate, a polysulfone, a polyarylate, vinylidene chloride, an acrylonitrile copolymer, and a polyvinyl benzal.

An application method such as a dipping method, a spray coating method, a spinner coating method, a bead coating method, a blade coating method, and a beam coating method can be used as a method of applying the photosensitive layer.

When the photosensitive layer is of a single-layer type, its thickness is preferably 5 to 40 µm, more preferably 10 to 30 µm.

When the photosensitive layer is of a laminated type, the thickness of the charge-generating layer is preferably 0.01 to 10 µm, more preferably 0.1 to 3 µm. In addition, the thickness of the charge-transporting layer is preferably 5 to 40 µm, more preferably 10 to 30 µm.

When the photosensitive layer is of a laminated type, the content of the charge-generating substance is preferably 20 to 90 mass %, more preferably 50 to 80 mass % with respect to the total mass of the charge-generating layer. In addition, the content of the charge-transporting substance is preferably 20 to 80 mass %, more preferably 30 to 70 mass % with respect to the total mass of the charge-transporting layer.

When the photosensitive layer is of a single-layer type, the content of the charge-generating substance is preferably 3 to 30 mass % with respect to the total mass of the photosensitive layer. In addition, the content of the charge-transporting substance is preferably 30 to 70 mass % with respect to the total mass of the photosensitive layer.

When the phthalocyanine crystal according to the present invention is used as a charge-generating substance, the substance can be mixed with any other charge-generating substance before use. In this case, the content of the phthalocyanine crystal is preferably 50 mass % or more with respect to all charge-generating substances.

A protective layer may be provided on the photosensitive layer as required. The protective layer can be formed by: applying a coating liquid for the protective layer, which is obtained by dissolving a resin such as a polyvinyl butyral, a polyester, a polycarbonate (e.g., a polycarbonate Z and a modified polycarbonate), a nylon, a polyimide, a polyarylate, a polyurethane, a styrene-butadiene copolymer, a styrene-acrylic acid copolymer, and a styrene-acrylonitrile copolymer in an organic solvent, onto the photosensitive layer; and drying the resultant applied film.

The thickness of the protective layer is preferably 0.05 to 20 µm.

An electro-conductive particle, a UV absorber, or the like may be incorporated into the protective layer. Examples of the electro-conductive particle include metal oxide particles such as a tin oxide particle.

FIG. 1 is a view illustrating an example of the schematic configuration of an electrophotographic apparatus provided with a process cartridge having the electrophotographic photosensitive member of the present invention.

A cylindrical (drum-shaped) electrophotographic photosensitive member 1 is rotationally driven about an axis 2 in a direction indicated by an arrow at a predetermined peripheral speed (process speed).

The surface of the electrophotographic photosensitive member 1 is charged to a predetermined positive or negative electric potential by a charging unit 3 during the rotation process. Next, the charged surface of the electrophotographic photosensitive member 1 is irradiated with image exposure light 4 from an image exposing unit (not shown) and then an electrostatic latent image corresponding to target image information is formed. The image exposure light 4 is, for example, light to be output from the image exposing unit such as a slit exposure and a laser beam scanning exposure, the light having intensity modulated in correspondence with a time-series electrical digital image signal of the target image information.

The electrostatic latent image formed on the surface of the electrophotographic photosensitive member 1 is developed (subjected to normal development or reversal development) with toner stored in a developing unit 5. Thus, a toner image is formed on the surface of the electrophotographic photosensitive member 1. The toner image formed on the surface of the electrophotographic photosensitive member 1 is transferred onto a transfer material 7 by a transferring unit 6. At this time, a bias voltage opposite in polarity to the charge which the toner possesses is applied from a bias power source (not shown) to the transferring unit 6. In addition, when the transfer material 7 is paper, the transfer material 7 is taken out of a sheet-feeding portion (not shown), and is then fed into a gap between the electrophotographic photosensitive member 1 and the transferring unit 6 in synchronization with the rotation of the electrophotographic photosensitive member 1.

The transfer material 7 onto which the toner image has been transferred from the electrophotographic photosensitive member 1 is separated from the surface of the electrophotographic photosensitive member 1 and then conveyed to an image fixing unit 8 where the transfer material is subjected to a treatment for fixing the toner image. Thus, the transfer material is printed out as an image-formed product (print or copy) to the outside of the electrophotographic apparatus.

The surface of the electrophotographic photosensitive member 1 after the transfer of the toner image onto the transfer material 7 is subjected to the removal of an attached matter such as the toner (transfer residual toner) by a cleaning unit 9, thereby being cleaned. A cleaner-less system has been developed in recent years and hence the transfer residual toner can be directly removed with developing equipment or the like. Further, the surface of the electrophotographic photosensitive member 1 is subjected to a neutralization treatment by pre-exposure light 10 from pre-exposing unit (not shown) before being repeatedly used for image formation. It should be noted that when the charging unit 3 is a contact charging unit using a charging roller or the like, the pre-exposing unit is not necessarily needed.

In the present invention, the following configuration can be adopted. Multiple components out of the components such as the electrophotographic photosensitive member 1, the charging unit 3, the developing unit 5, and the cleaning unit 9 are stored in a container and integrally supported to form a process cartridge, and then the process cartridge can be detachably mountable to the main body of the electrophotographic apparatus. For example, the following configuration can be adopted. At least one selected from the charging unit 3, the developing unit 5, and the cleaning unit 9 is integrally supported with the electrophotographic photosensitive member 1 to provide a cartridge, and then the cartridge is used as a process cartridge 11 detachably mountable to the main body of the electrophotographic apparatus with a guiding unit 12 such as a rail of the main body of the electrophotographic apparatus.

When the electrophotographic apparatus is a copying machine or a printer, the image exposure light 4 may be reflected light or transmitted light from a manuscript. Alternatively, the light may be light radiated by, for example, scanning with a laser beam, the driving of an LED array, or the driving of a liquid crystal shutter array to be performed in accordance with a signal turned from the manuscript read with a sensor.

The electrophotographic photosensitive member 1 of the present invention is also widely applicable to the fields of application of electrophotography such as a laser beam printer, a CRT printer, an LED printer, a FAX, a liquid crystal printer, and laser plate making.

EXAMPLES

Hereinafter, the present invention is described in more detail by way of specific examples, provided that the present invention is not limited to these examples. It should be noted that the thickness of each layer of any one of the electrophotographic photosensitive members of examples and comparative examples was determined with an eddy-current thickness meter (Fischerscope manufactured by Fischer Instruments), or was determined from its mass per unit area by specific gravity conversion.

Example 1-1

Figure 2A:
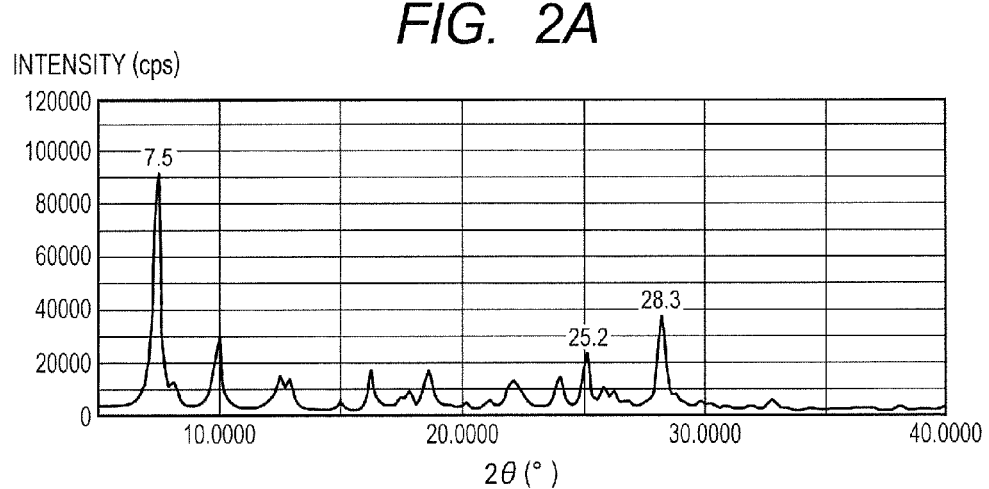
FIG. 2A is a powder X-ray diffraction pattern of a hydroxygallium phthalocyanine crystal obtained in Example 1-1.
Figure 2B:
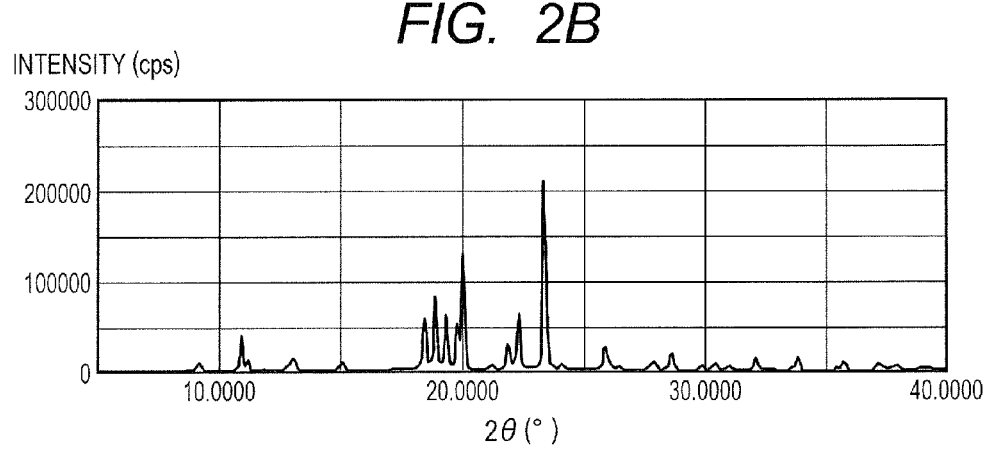
FIG. 2B is a powder X-ray diffraction pattern of Exemplified Compound (A-1) used in Example 1-1.

0.5 Part of a hydroxygallium phthalocyanine crystal obtained by the same treatment as that of Example 1-1 subsequent to Synthesis Example 1 described in Japanese Patent Application Laid-Open No. 2011-94101, 1.0 part of Exemplified Compound (A-1) (product code: 159400050, manufactured by Acros Organics), and 10 parts of N,N-dimethylformamide were subjected to a milling treatment in a ball mill together with 20 parts of glass beads each having a diameter of 0.8 mm at room temperature (23° C.) for 40 hours. A hydroxygallium phthalocyanine crystal was taken out of the dispersion with N,N-dimethylformamide and filtered, and then the residue on the filter was sufficiently washed with tetrahydrofuran. The filter residue was vacuum-dried to yield 0.45 part of a hydroxygallium phthalocyanine crystal. FIG. 2A shows the powder X-ray diffraction pattern of the resultant crystal and FIG. 2B shows the powder X-ray diffraction pattern of Exemplified Compound (A-1) used here.

In addition, Table 4 shows an excerpt of TG data on the resultant crystal and Exemplified Compound (A-1). As shown in the excerpt, in the crystal obtained in Example 1-1, a weight reduction amount increases in a range not less than 500° C., which is higher than the evaporation temperature of Exemplified Compound (A-1) alone (200° C. to 305° C.), indicating that Exemplified Compound (A-1) is incorporated into the hydroxygallium phthalocyanine crystal obtained in Example 1-1.

In addition, NMR measurement confirmed that Exemplified Compound (A-1) was incorporated at 0.31% into the crystal.

Example 1-2

0.45 Part of a hydroxygallium phthalocyanine crystal was obtained by the same treatment as that of Example 1-1 except that in Example 1-1, 1.0 part of Exemplified Compound (A-1) was changed to 2.0 parts of Exemplified Compound (A-1). The powder X-ray diffraction pattern of the resultant hydroxygallium phthalocyanine crystal was the same as FIG. 2A.

In addition, Table 4 shows an excerpt of TG data on the resultant crystal. As shown in the excerpt, a weight reduction amount increases in a range not less than 305° C., which is higher than the evaporation temperature of Exemplified Compound (A-1) alone (200° C. to 305° C.), indicating that Exemplified Compound (A-1) is incorporated into the hydroxygallium phthalocyanine crystal obtained in Example 1-2.

In addition, NMR measurement confirmed that Exemplified Compound (A-1) was incorporated at 0.82% into the crystal.

Example 1-3

Figure 3A:
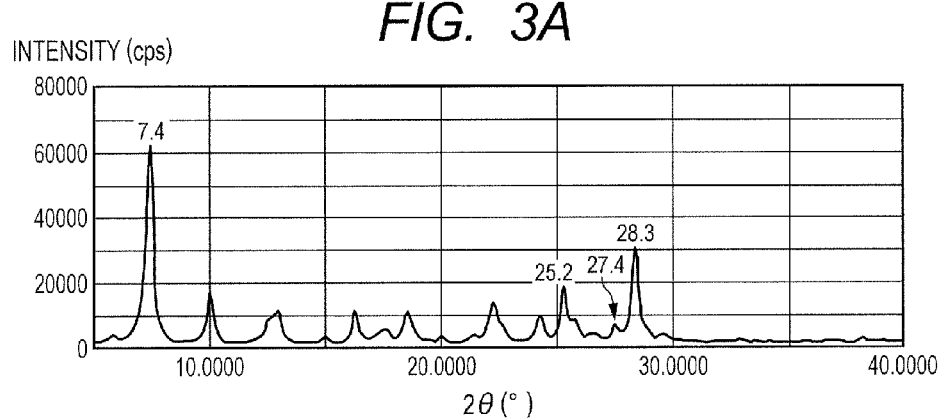
FIG. 3A is a powder X-ray diffraction pattern of a hydroxygallium phthalocyanine crystal obtained in Example 1-3.

0.35 Part of a hydroxygallium phthalocyanine crystal was obtained by the same treatment as that of Example 1-1 except that in Example 1-1, 10 parts of N,N-dimethylformamide were changed to 10 parts of dimethyl sulfoxide. FIG. 3A shows the powder X-ray diffraction pattern of the resultant hydroxygallium phthalocyanine crystal.

In addition, NMR measurement confirmed that Exemplified Compound (A-1) was incorporated at 0.83% into the crystal.

Example 1-4

Figure 3B:
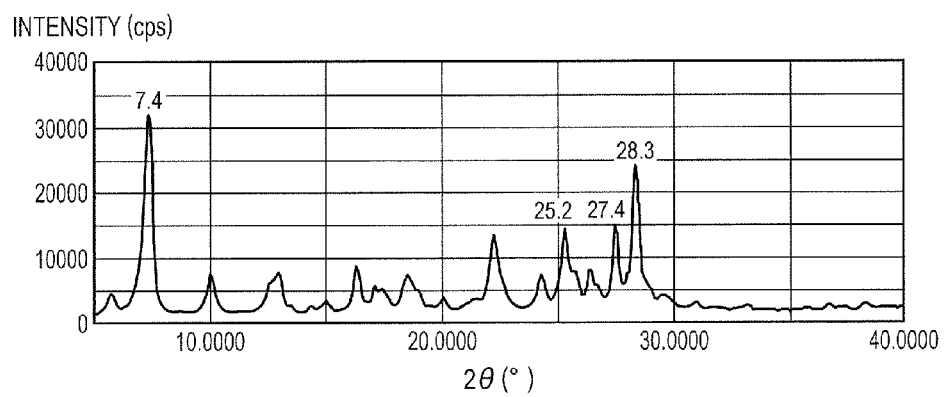
FIG. 3B is a powder X-ray diffraction pattern of a hydroxygallium phthalocyanine crystal obtained in Example 1-4.

0.42 Part of a hydroxygallium phthalocyanine crystal was obtained by the same treatment as that of Example 1-1 except that in Example 1-1, 10 parts of N,N-dimethylformamide were changed to 10 parts of N-methyl-2-pyrrolidone. FIG. 3B shows the powder X-ray diffraction pattern of the resultant hydroxygallium phthalocyanine crystal.

In addition, NMR measurement confirmed that Exemplified Compound (A-1) was incorporated at 1.67% into the crystal.

Example 1-5

0.46 Part of a hydroxygallium phthalocyanine crystal was obtained by the same treatment as that of Example 1-1 except that in Example 1-1, 1.0 part of Exemplified Compound (A-1) was changed to 0.5 part of Exemplified Compound (A-2) (product code: H0470, manufactured by TOKYO CHEMI- CAL INDUSTRY CO., LTD.). The powder X-ray diffraction pattern of the resultant hydroxygallium phthalocyanine crystal was the same as FIG. 2A.

In addition, NMR measurement confirmed that Exemplified Compound (A-2) was incorporated at 0.16% into the crystal.

Example 1-6

0.37 Part of a hydroxygallium phthalocyanine crystal was obtained by the same treatment as that of Example 1-3 except that in Example 1-3, 1.0 part of Exemplified Compound (A-1) was changed to 1.0 part of Exemplified Compound (A-2). The powder X-ray diffraction pattern of the resultant hydroxygallium phthalocyanine crystal was the same as FIG. 2A.

In addition, NMR measurement confirmed that Exemplified Compound (A-2) was incorporated at 0.30% into the crystal.

Example 1-7

Figure 4:
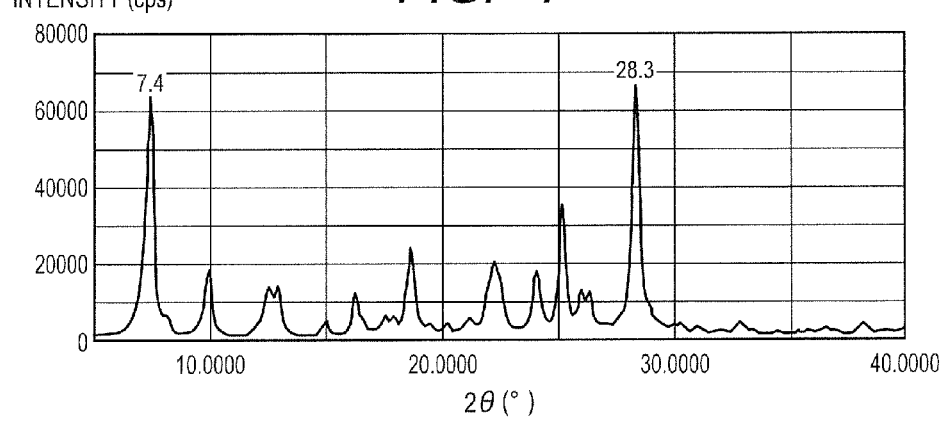
FIG. 4 is a powder X-ray diffraction pattern of a hydroxygallium phthalocyanine crystal obtained in Comparative Example 1-3.

0.46 Part of a hydroxygallium phthalocyanine crystal was obtained by the same treatment as that of Example 1-4 except that in Example 1-4, 1.0 part of Exemplified Compound (A-1) was changed to 0.5 part of Exemplified Compound (A-2). FIG. 4 shows the powder X-ray diffraction pattern of the resultant hydroxygallium phthalocyanine crystal.

In addition, NMR measurement confirmed that Exemplified Compound (A-2) was incorporated at 0.49% into the crystal.

Example 1-8

0.43 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (A-7) (product code: D0577, manufactured by TOKYO CHEMICAL INDUSTRY CO., LTD.). The powder X-ray diffraction pattern of the resultant hydroxygallium phthalocyanine crystal was the same as FIG. 2A.

In addition, NMR measurement confirmed that Exemplified Compound (A-7) was incorporated at 0.29% into the crystal.

Example 1-9

0.43 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (A-5) (product code: D3347, manufactured by TOKYO CHEMICAL INDUSTRY CO., LTD.). The powder X-ray diffraction pattern of the resultant hydroxygallium phthalocyanine crystal was the same as FIG. 2A.

In addition, NMR measurement confirmed that Exemplified Compound (A-5) was incorporated at 0.30% into the crystal.

Example 1-10

0.43 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (A-4) (product code: D0573, manufactured by TOKYO CHEMICAL INDUSTRY CO., LTD.). The powder X-ray diffraction pattern of the resultant hydroxygallium phthalocyanine crystal was the same as FIG. 2A.

In addition, NMR measurement confirmed that Exemplified Compound (A-4) was incorporated at 0.25% into the crystal.

Example 1-11

0.43 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (A-8) (product code: D1099, manufactured by TOKYO CHEMICAL INDUSTRY CO., LTD.). The powder X-ray diffraction pattern of the resultant hydroxygallium phthalocyanine crystal was the same as FIG. 2A.

In addition, NMR measurement confirmed that Exemplified Compound (A-8) was incorporated at 0.29% into the crystal.

Example 1-12

0.43 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (A-6) (product code: T0996, manufactured by TOKYO CHEMICAL INDUSTRY CO., LTD.). The powder X-ray diffraction pattern of the resultant hydroxygallium phthalocyanine crystal was the same as FIG. 2A.

In addition, NMR measurement confirmed that Exemplified Compound (A-6) was incorporated at 0.31% into the crystal.

Example 1-13

0.38 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (A-10) (product code: D0765, manufactured by TOKYO CHEMICAL INDUSTRY CO., LTD.). The powder X-ray diffraction pattern of the resultant hydroxygallium phthalocyanine crystal was the same as FIG. 2A.

In addition, Table 4 shows an excerpt of TG data on the resultant crystal. As shown in the excerpt, a weight reduction amount increases in a range not less than 450° C., which is a temperature higher than the range of 170° C. to 300° C. showing a weight reduction caused by the evaporation of Exemplified Compound (A-10), indicating that Exemplified Compound (A-10) is incorporated into the hydroxygallium phthalocyanine crystal obtained in Example 1-13.

Example 1-14

0.38 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (A-11) (product code: 12124-1A, manufactured by TOKYO CHEMICAL INDUSTRY CO., LTD.). The powder X-ray diffraction pattern of the resultant hydroxygallium phthalocyanine crystal was the same as FIG. 2A.

In addition, Table 4 shows an excerpt of TG data on the resultant crystal. As shown in the excerpt, a weight reduction amount increases in a range not less than 450° C., which is a temperature higher than the range of 140° C. to 270° C. showing a weight reduction caused by the evaporation of Exemplified Compound (A-11), indicating that Exemplified Compound (A-11) is incorporated into the hydroxygallium phthalocyanine crystal obtained in Example 1-14.

Example 1-15

0.38 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (A-12) (product code: 5091, manufactured by Rieke Metals, Inc.). The powder X-ray diffraction pattern of the resultant hydroxygallium phthalocyanine crystal was the same as FIG. 2A.

In addition, Table 4 shows an excerpt of TG data on the resultant crystal. As shown in the excerpt, a weight reduction amount increases in a range not less than 360° C., which is a temperature higher than the range of 190° C. to 280° C. showing a weight reduction caused by the evaporation of Exemplified Compound (A-12), indicating that Exemplified Compound (A-12) is incorporated into the hydroxygallium phthalocyanine crystal obtained in Example 1-15.

Example 1-16

0.38 Part of a hydroxygallium phthalocyanine crystal was obtained by the same treatment as that of Example 1-3 except that in Example 1-3, 1.0 part of Exemplified Compound (A-1) was changed to 1.0 part of Exemplified Compound (A-3). The powder X-ray diffraction pattern of the resultant hydroxygallium phthalocyanine crystal was the same as FIG. 2A.

In addition, NMR measurement confirmed that Exemplified Compound (A-3) was incorporated at 0.30% into the crystal.

Comparative Example 1-1

0.4 Part of a hydroxygallium phthalocyanine crystal was obtained by the same treatment as that of Example 1-1 except that in Example 1-1, 1.0 part of Exemplified Compound (A-1) was not added. The powder X-ray diffraction pattern of the resultant hydroxygallium phthalocyanine crystal was the same as FIG. 2A.

In addition, Table 4 shows an excerpt of TG data on the resultant crystal.

Comparative Example 1-2

0.38 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (B-2). The powder X-ray diffraction pattern of the resultant hydroxygallium phthalocyanine crystal was the same as FIG. 2A.

In addition, Table 4 shows an excerpt of TG data on the resultant crystal. As shown in the excerpt, a weight reduction amount increases in a range not less than 450° C., which is a temperature higher than the range of 170° C. to 300° C. showing a weight reduction caused by the evaporation of Exemplified Compound (B-2), indicating that Exemplified Compound (B-2) is incorporated into the hydroxygallium phthalocyanine crystal obtained in Comparative Example 1-2.

Comparative Example 1-3

0.4 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (C-1). FIG. 4 shows the powder X-ray diffraction pattern of the resultant hydroxygallium phthalocyanine crystal.

In addition, Table 4 shows an excerpt of TG data on the resultant crystal. As shown in the excerpt, a weight reduction amount increases in a range not less than 360° C., which is a temperature higher than the range of 220° C. to 330° C. showing a weight reduction caused by the evaporation of Exemplified Compound (C-1), indicating that Exemplified Compound (C-1) is incorporated into the hydroxygallium phthalocyanine crystal obtained in Comparative Example 1-3.

Comparative Example 1-4

0.14 Part of a hydroxygallium phthalocyanine crystal was obtained by the same treatment as that of Example 1-1 except that in Example 1-1, 1.0 part of Exemplified Compound (A-1) was changed to 1.0 part of Exemplified Compound (B-1). The powder X-ray diffraction pattern of the resultant hydroxygallium phthalocyanine crystal was the same as FIG. 2A.

In addition, Table 4 shows an excerpt of TG data on the resultant crystal. As shown in the excerpt, a weight reduction amount increases in a range not less than 360° C., which is a temperature higher than the range of 100° C. to 226° C. showing a weight reduction caused by the evaporation of Exemplified Compound (B-1), indicating that Exemplified Compound (B-1) is incorporated into the hydroxygallium phthalocyanine crystal obtained in Comparative Example 1-4.

Comparative Example 1-5

Figure 5A:
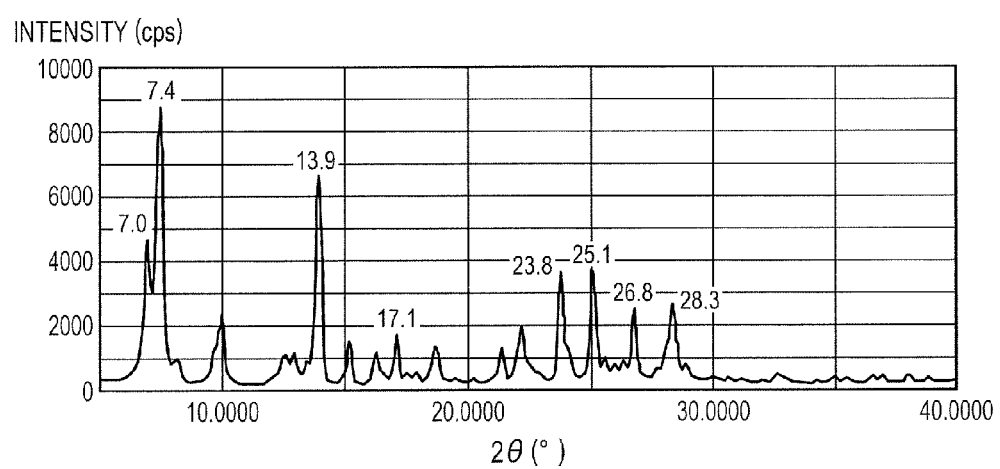
FIG. 5A is a powder X-ray diffraction pattern of a mixture containing a hydroxygallium phthalocyanine crystal obtained in Comparative Example 1-5.
Figure 5B:
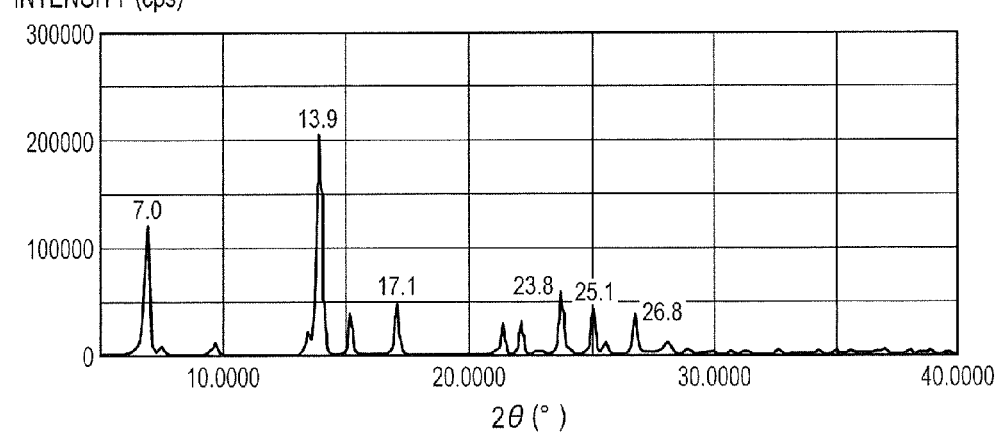
FIG. 5B is a powder X-ray diffraction pattern of 2-morpholinoanthraquinone used in Comparative Example 1-5.

1.0 Part of a mixture of a hydroxygallium phthalocyanine crystal having peaks at Bragg angles 2θ±0.2° of 7.4° and 28.3° in CuKα characteristic X-ray diffraction and a 2-morpholinoanthraquinone crystal having peaks at Bragg angles 2θ±0.2° of 7.0°, 13.9°, 17.1°, 23.8°, 25.1°, and 26.8° in CuKα characteristic X-ray diffraction was obtained by the same treatment as that of Example 1-1 except that in Example 1-1, 1.0 part of Exemplified Compound (A-1) was changed to 1.0 part of Exemplified Compound (B-9). FIG. 5A shows the powder X-ray diffraction pattern of the resultant mixture and FIG. 5B shows the powder X-ray diffraction pattern of Exemplified Compound (B-9) added here.

In addition, Table 4 shows an excerpt of TG data on the resultant mixture. As shown in the excerpt, an increase in weight reduction amount is observed in the range of 200° C. to 350° C. showing a weight reduction caused by the evaporation of Exemplified Compound (B-9) but no increase in weight reduction amount is observed at higher temperatures. Accordingly, it can be judged that the mixture is such a mere mixture that Exemplified Compound (B-9) is not incorporated into the hydroxygallium phthalocyanine crystal. A mixing ratio "hydroxygallium phthalocyanine:Exemplified Compound (B-9)" can be calculated to be about 4:6 from the TG data.

Comparative Example 1-6

Figure 6A:
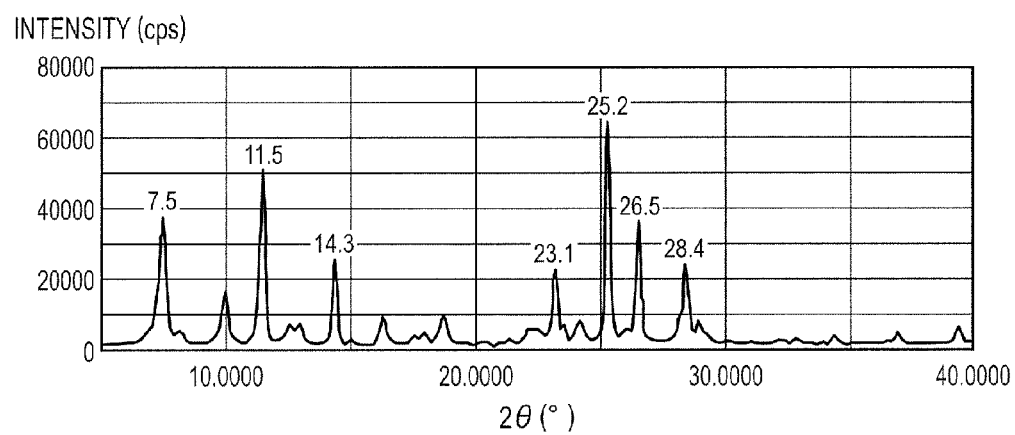
FIG. 6A is a powder X-ray diffraction pattern of a mixture containing a hydroxygallium phthalocyanine crystal obtained in Comparative Example 1-6.
Figure 6B:
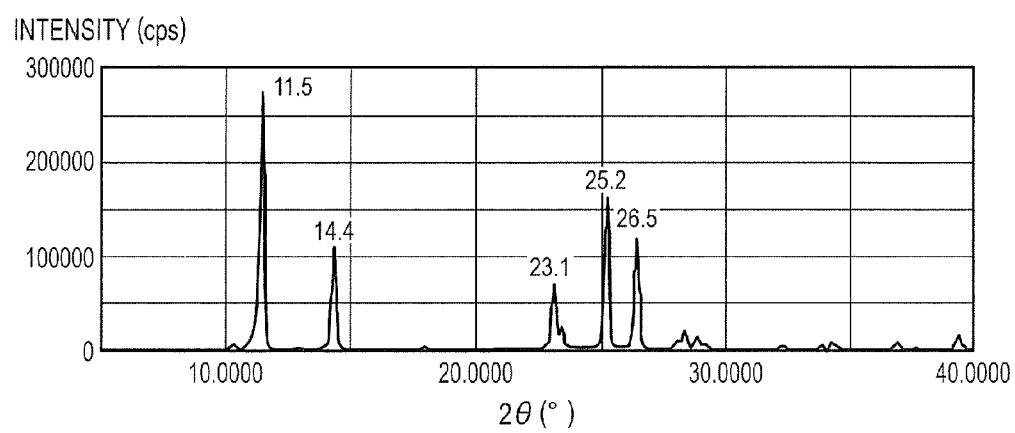
FIG. 6B is a powder X-ray diffraction pattern of anthraquinone used in Comparative Example 1-6.

0.8 Part of a mixture of a hydroxygallium phthalocyanine crystal having peaks at Bragg angles 2θ±0.2° of 7.4° and 28.3° in CuKα characteristic X-ray diffraction and the crystal of Exemplified Compound (B-7) having peaks at Bragg angles 2θ±0.2° of 11.5°, 14.4°, 23.1°, 25.2°, and 26.5° in CuKα characteristic X-ray diffraction was obtained by the same treatment as that of Example 1-1 except that in Example 1-1, 1.0 part of Exemplified Compound (A-1) was changed to 1.0 part of Exemplified Compound (B-7). FIG. 6A shows the powder X-ray diffraction pattern of the resultant mixture and FIG. 6B shows the powder X-ray diffraction pattern of Exemplified Compound (B-7) added here.

In addition, Table 4 shows an excerpt of TG data on the resultant mixture. As shown in the excerpt, an increase in weight reduction amount is observed in the range of 180° C. to 280° C. showing a weight reduction caused by the evaporation of Exemplified Compound (B-7) but no increase in weight reduction amount is observed at higher temperatures. Accordingly, it can be judged that the mixture is such a mere mixture that Exemplified Compound (B-7) is not incorporated into the hydroxygallium phthalocyanine crystal. A mixing ratio "hydroxygallium phthalocyanine:Exemplified Compound (B-7)" can be calculated to be about 4:6 from the TG data.

Comparative Example 1-7

0.41 Part of a mixture of a hydroxygallium phthalocyanine crystal and the crystal of Exemplified Compound (C-2) was obtained by the same treatment as that of Example 1-1 except that in Example 1-1, 1.0 part of Exemplified Compound (A-1) was changed to 1.0 part of Exemplified Compound (C-2).

Comparative Example 1-8

0.39 Part of a mixture of a hydroxygallium phthalocyanine crystal and the crystal of Exemplified Compound (C-3) was obtained by the same treatment as that of Example 1-1 except that in Example 1-1, 1.0 part of Exemplified Compound (A-1) was changed to 1.0 part of Exemplified Compound (C-3).

Comparative Example 1-9

0.40 Part of a mixture of a hydroxygallium phthalocyanine crystal and the crystal of Exemplified Compound (C-4) was obtained by the same treatment as that of Example 1-1 except that in Example 1-1, 1.0 part of Exemplified Compound (A-1) was changed to 1.0 part of Exemplified Compound (C-4).

Comparative Example 1-10

0.42 Part of a mixture of a hydroxygallium phthalocyanine crystal and the crystal of Exemplified Compound (B-19) was obtained by the same treatment as that of Example 1-1 except that in Example 1-1, 1.0 part of Exemplified Compound (A-1) was changed to 1.0 part of Exemplified Compound (B-19).

Example 2-1

A solution formed of 60 parts of barium sulfate particles coated with tin oxide (trade name: Passtran PC1, manufactured by MITSUI MINING & SMELTING CO., LTD.), 15 parts of titanium oxide particles (trade name: TITANIX JR, manufactured by TAYCA CORPORATION), 43 parts of a resole-type phenol resin (trade name: Phenolite J-325, manufactured by DIC Corporation, solid content: 70 mass %), 0.015 part of a silicone oil (trade name: SH28PA, manufactured by Dow Corning Toray Co., Ltd.), 3.6 parts of a silicone resin (trade name: Tospearl 120, manufactured by Momentive Performance Materials Inc.), 50 parts of 2-methoxy-1-propanol, and 50 parts of methanol was subjected to a dispersion treatment in a ball mill for 20 hours. Thus, a coating liquid for an electro-conductive layer was prepared.

The coating liquid for an electro-conductive layer was applied onto an aluminum cylinder (having a diameter of 24 mm) as a support by immersion and then the resultant applied film was dried for 30 minutes at 140° C. Thus, an electro-conductive layer having a thickness of 15 μm was formed.

Next, 10 parts of a copolymer nylon resin (trade name: Amilan CM8000, manufactured by Toray Industries, Inc.) and 30 parts of a methoxymethylated 6-nylon resin (trade name: Toresin EF-30T, manufactured by Nagase ChemteX Corporation) were dissolved in a mixed solvent of 400 parts of methanol and 200 parts of n-butanol. Thus, a coating liquid for an undercoat layer was prepared.

The coating liquid for an undercoat layer was applied onto the electro-conductive layer by immersion and then the resultant applied film was dried. Thus, an undercoat layer having a thickness of 0.5 μm was formed.

Next, 10 parts of the hydroxygallium phthalocyanine crystal (charge-generating substance) obtained in Example 1-1, 5 parts of a polyvinyl butyral (trade name: S-LEC BX-1, manufactured by SEKISUI CHEMICAL CO., LTD.), and 250 parts of cyclohexanone were loaded into a sand mill using glass beads each having a diameter of 1 mm, and were then subjected to a dispersion treatment for 1 hour. The treated product was diluted with 250 parts of ethyl acetate. Thus, a coating liquid for a charge-generating layer was prepared.

The coating liquid for a charge-generating layer was applied onto the undercoat layer by immersion and then the resultant applied film was dried for 10 minutes at 100° C. Thus, a charge-generating layer having a thickness of 0.16 μm was formed.

Next, 8 parts of a compound (charge-transporting substance) represented by the following formula (2) and 10 parts of a copolymerization type polyarylate resin represented by the following formula (3) (copolymerization ratio m:n=7:3, weight-average molecular weight: 130,000) were dissolved in 70 parts of monochlorobenzene. Thus, a coating liquid for a charge-transporting layer was prepared.

(2)

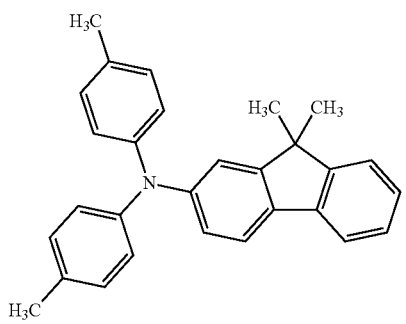

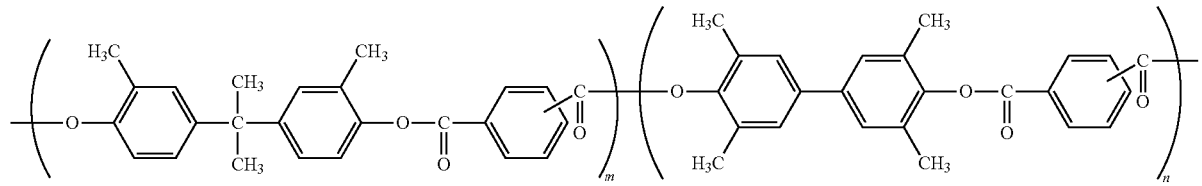

(3)

The coating liquid for a charge-transporting layer was applied onto the charge-generating layer by immersion and then the resultant applied film was dried for 1 hour at 110° C. Thus, a charge-transporting layer having a thickness of 23 μm was formed.

Thus, a cylindrical (drum-shaped) electrophotographic photosensitive member of Example 2-1 was produced.

Example 2-2

An electrophotographic photosensitive member of Example 2-2 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-2.

Example 2-3

An electrophotographic photosensitive member of Example 2-3 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-3.

Example 2-4

An electrophotographic photosensitive member of Example 2-4 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-4.

Example 2-5

An electrophotographic photosensitive member of Example 2-5 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-5.

Example 2-6

An electrophotographic photosensitive member of Example 2-6 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-6.

Example 2-7

An electrophotographic photosensitive member of Example 2-7 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-7.

Example 2-8

An electrophotographic photosensitive member of Example 2-8 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-8.

Example 2-9

An electrophotographic photosensitive member of Example 2-9 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-9.

Example 2-10

An electrophotographic photosensitive member of Example 2-10 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-10.

Example 2-11

An electrophotographic photosensitive member of Example 2-11 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-11.

Example 2-12

An electrophotographic photosensitive member of Example 2-12 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-12.

Example 2-13

An electrophotographic photosensitive member of Example 2-13 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-13.

Example 2-14

An electrophotographic photosensitive member of Example 2-14 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-14.

Example 2-15

An electrophotographic photosensitive member of Example 2-15 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-15.

Example 2-16

An electro-conductive layer, an undercoat layer, and a charge-generating layer were formed on a support in the same manner as in Example 2-2. Next, 10 parts of a compound (charge-transporting substance) represented by the following formula (4) and 10 parts of a copolymerization type polyarylate resin represented by the formula (3) (copolymerization ratio m:n=7:3, weight-average molecular weight: 130,000) were dissolved in 100 parts of monochlorobenzene. Thus, a coating liquid for a charge-transporting layer was prepared.

The coating liquid for a charge-transporting layer was applied onto the charge-generating layer by immersion and then the resultant applied film was dried for minutes at 150° C. Thus, a charge-transporting layer having a thickness of 15 µm was formed.

Thus, an electrophotographic photosensitive member of Example 2-16 was produced.

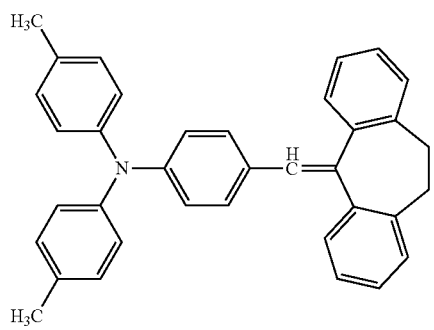

(4)

Comparative Example 2-1

An electrophotographic photosensitive member of Comparative Example 2-1 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-1.

Comparative Example 2-2

An electrophotographic photosensitive member of Comparative Example 2-2 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-2.

Comparative Example 2-3

An electrophotographic photosensitive member of Comparative Example 2-3 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-3.

Comparative Example 2-4

An electrophotographic photosensitive member of Comparative Example 2-4 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-4.

Comparative Example 2-5

An electrophotographic photosensitive member of Comparative Example 2-5 was produced in the same manner as in Example 2-1 except that in Example 2-1, the hydroxygallium phthalocyanine crystal used in the preparation of the coating liquid for a charge-generating layer was changed to the mixture obtained in Comparative Example 1-5.

Comparative Example 2-6

An electrophotographic photosensitive member of Comparative Example 2-6 was produced in the same manner as in Example 2-1 except that in Example 2-1, the hydroxygallium phthalocyanine crystal used in the preparation of the coating liquid for a charge-generating layer was changed to the mixture obtained in Comparative Example 1-6.

Comparative Example 2-7

An electrophotographic photosensitive member of Comparative Example 2-7 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-7.

Comparative Example 2-8

An electrophotographic photosensitive member of Comparative Example 2-8 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-8.

Comparative Example 2-9

An electrophotographic photosensitive member of Comparative Example 2-9 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-9.

Comparative Example 2-10

An electrophotographic photosensitive member of Comparative Example 2-10 was produced in the same manner as in Comparative Example 2-1 except that in Comparative Example 2-1, the hydroxygallium phthalocyanine crystal used in the preparation of the coating liquid for a charge-generating layer was changed to the hydroxygallium phthalocyanine crystal obtained in Comparative Example 1-10.

(Evaluations of Examples 2-1 to 2-16 and Comparative Examples 2-1 to 2-10)

The electrophotographic photosensitive members of Examples 2-1 to 2-16 and Comparative Examples 2-1 to 2-10 were evaluated for an electric potential variation after repeated use of the photosensitive member.

Used as an electrophotographic apparatus for the evaluation was a laser beam printer manufactured by Hewlett-Packard Japan, Ltd. (trade name: Color Laser Jet CP3525dn) reconstructed so as to operate with a charging condition and an image exposure value that were variable. In addition, the printer was reconstructed so as to operate when the produced electrophotographic photosensitive members was mounted on a process cartridge for a cyan color and the cartridge was attached to a station for the cyan process cartridge, and a process cartridge for any other color was not mounted on the main body of the printer.

Upon output of an image, only the process cartridge for a cyan color was attached to the main body and a monochromatic image formed with a cyan toner alone was output.

The electrophotographic photosensitive member was left to stand under a low-temperature, low-humidity environment having a temperature of 15° C. and a relative humidity of 10% RH for 3 days together with the electrophotographic apparatus for the evaluation. After that, the charging condition and the image exposure value were adjusted so that a dark portion potential and a light portion potential at an initial stage were −500 V and −100 V, respectively. The surface potential of the drum-shaped electrophotographic photosensitive member upon setting of an electric potential was measured as described below. The cartridge was reconstructed, a potential probe (trade name: model 6000B-8, manufactured by TREK JAPAN) was mounted at a development position, and an electric potential at the central portion of the cylindrical electrophotographic photosensitive member was measured with a surface potentiometer (trade name: model 344, manufactured by TREK JAPAN).

After that, a 1,000-sheet repeated use test was performed and an electric potential was measured immediately after the 1,000-sheet repeated use test. Table 5 shows an amount of variation between electric potentials before and after the repeated use.

It should be noted that the repeated use test was performed under such a condition that an E-letter image was printed on A4-size plain paper at a print percentage of 1% with a cyan color alone.

As can be seen from Table 5, when the electrophotographic photosensitive member including the phthalocyanine crystal containing the compound satisfying the formulae (A) and (B) in itself of the present application is used, a long-term electric potential variation in association with its repeated use can be significantly alleviated as compared with that in an example in which such electrophotographic photosensitive member is not used.

TABLE 4

Results of TG measurement

| | Remaining mass % at each temperature | | | | | | |
|---|---|---|---|---|---|---|---|
| | 40° C. | 100° C. | 200° C. | 360° C. | 450° C. | 500° C. | 560° C. |
| Example 1-1 | 99.9% | 99.8% | 99.3% | 95.8% | 95.5% | 94.7% | 89.7% |
| Example 1-2 | 100.1% | 100.0% | 99.4% | 94.9% | 88.2% | 78.4% | 61.1% |
| Example 1-13 | 100.1% | 100.0% | 99.4% | 95.9% | 95.7% | 94.5% | 90.2% |
| Example 1-14 | 100.3% | 100.2% | 99.5% | 95.8% | 95.0% | 94.2% | 88.5% |
| Example 1-15 | 99.8% | 99.7% | 99.2% | 95.8% | 95.2% | 94.3% | 88.7% |
| Comparative Example 1-1 | 100.1% | 100.0% | 99.7% | 96.8% | 96.6% | 95.7% | 92.7% |
| Comparative Example 1-2 | 100.1% | 100.0% | 99.4% | 95.9% | 95.7% | 94.5% | 90.2% |
| Comparative Example 1-3 | 100.3% | 100.2% | 99.3% | 95.2% | 94.8% | 93.4% | 86.9% |
| Comparative Example 1-4 | 100.2% | 99.6% | 97.0% | 93.5% | 93.0% | 91.4% | 86.5% |
| Comparative Example 1-5 | 100.0% | 100.0% | 99.9% | 40.2% | 39.7% | 38.2% | 36.9% |
| Comparative Example 1-6 | 100.0% | 100.0% | 97.3% | 96.8% | 38.6% | 37.2% | 36.9% |
| Exemplified Compound (A-1) | 100.0% | 99.9% | 99.1% | 0.0% | 0.0% | 0.0% | 0.0% |

TABLE 5

Results of measurement of electric potential variation

| | Amount of variation between electric potentials before and after repeated use (V) |
|---|---|
| Example 2-1 | 24 |
| Example 2-2 | 20 |
| Example 2-3 | 20 |
| Example 2-4 | 16 |
| Example 2-5 | 29 |
| Example 2-6 | 25 |
| Example 2-7 | 21 |
| Example 2-8 | 24 |
| Example 2-9 | 25 |
| Example 2-10 | 28 |

TABLE 5-continued

Results of measurement of electric potential variation

| | Amount of variation between electric potentials before and after repeated use (V) |
|---|---|
| Example 2-11 | 22 |
| Example 2-12 | 25 |
| Example 2-13 | 30 |
| Example 2-14 | 18 |
| Example 2-15 | 35 |
| Example 2-16 | 25 |
| Comparative Example 2-1 | 50 |
| Comparative Example 2-2 | 46 |
| Comparative Example 2-3 | 56 |
| Comparative Example 2-4 | 49 |
| Comparative Example 2-5 | Unable to evaluate owing to insufficient sensitivity |
| Comparative Example 2-6 | Unable to evaluate owing to insufficient sensitivity |
| Comparative Example 2-7 | 52 |
| Comparative Example 2-8 | 50 |
| Comparative Example 2-9 | 45 |
| Comparative Example 2-10 | 48 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-262020, filed Nov. 30, 2011, and Japanese Patent Application No. 2012-244475, filed Nov. 6, 2012, which are hereby incorporated by reference herein in their entirety.

What is claimed is:

1. An electrophotographic photosensitive member, comprising:
    a support; and
    a photosensitive layer formed on the support,
    wherein the photosensitive layer comprises a phthalocyanine crystal in which a compound represented by the following formula (1) is contained:

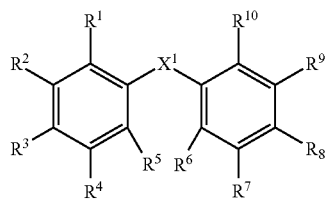

(1)

in the formula (1):
    $R^1$ to $R^{10}$ each independently represent a hydrogen atom, a hydroxy group, a halogen atom, an aryloxycarbonyl group, an acyl group, a substituted or unsubstituted alkyl group, or a substituted or unsubstituted aryloxy group;
    a substituent of the substituted alkyl group, and a substituent of the substituted aryloxy group is each a halogen atom, a hydroxy group, or an alkoxy group;
    at least one of $R^1$ to $R^{10}$ is a hydroxy group; and
    $X^1$ represents one of a carbonyl group and a dicarbonyl group.

2. The electrophotographic photosensitive member according to claim 1, wherein the phthalocyanine crystal is a hydroxygallium phthalocyanine crystal.

3. The electrophotographic photosensitive member according to claim 2, wherein the hydroxygallium phthalocyanine crystal is a hydroxygallium phthalocyanine crystal having peaks at Bragg angles 2θ±0.2° of 7.4° and 28.3° in CuKα X-ray diffraction.

4. A process cartridge, comprising:
    the electrophotographic photosensitive member according to claim 1; and
    at least one unit selected from the group consisting of
    a charging unit for charging a surface of the electrophotographic photosensitive member,
    a developing unit for developing an electrostatic latent image formed on the surface of the electrophotographic photosensitive member with toner to form a toner image, and
    a cleaning unit for removing the toner on the surface of the electrophotographic photosensitive member after transfer of the toner image onto a transfer material,
    the electrophotographic photosensitive member and the at least one unit being integrally supported,
    wherein the process cartridge is detachably mountable to a main body of an electrophotographic apparatus.

5. An electrophotographic apparatus, comprising:
    the electrophotographic photosensitive member according to claim 1;
    a charging unit for charging a surface of the electrophotographic photosensitive member;
    an image exposing unit for irradiating the charged surface of the electrophotographic photosensitive member with image exposure light to form an electrostatic latent image;
    a developing unit for developing the electrostatic latent image formed on the surface of the electrophotographic photosensitive member with toner to form a toner image; and
    a transferring unit for transferring the toner image formed on the surface of the electrophotographic photosensitive member onto a transfer material.

* * * * *